US009488728B2

(12) United States Patent
Baumann et al.

(10) Patent No.: US 9,488,728 B2
(45) Date of Patent: Nov. 8, 2016

(54) DIGITAL DEPTH READOUT ADAPTER FOR FLASHER TYPE FISH FINDER

(71) Applicant: Vexilar, Inc., Minneapolis, MN (US)

(72) Inventors: Steven E. Baumann, Bloomington, MN (US); Duane E. Cummings, Juneau, AK (US)

(73) Assignee: Vexilar, Inc., Minneapolis, MN (US)

( * ) Notice: Subject to any disclaimer, the term of this patent is extended or adjusted under 35 U.S.C. 154(b) by 244 days.

(21) Appl. No.: 14/095,514

(22) Filed: Dec. 3, 2013

(65) Prior Publication Data

US 2014/0153370 A1 Jun. 5, 2014

Related U.S. Application Data

(60) Provisional application No. 61/732,625, filed on Dec. 3, 2012.

(51) Int. Cl.
*G01S 7/56* (2006.01)
*G01S 15/96* (2006.01)

(52) U.S. Cl.
CPC . *G01S 15/96* (2013.01); *G01S 7/56* (2013.01)

(58) Field of Classification Search
CPC .................................. G01S 15/96; G01S 7/56
IPC ........................................................ G01S 15/96
See application file for complete search history.

(56) References Cited

U.S. PATENT DOCUMENTS 4,122,428 A * 10/1978 Morrow, Jr. ........... G01D 13/22 367/108
4,339,811 A 7/1982 Bednarz et al.
4,616,350 A * 10/1986 Tendler ..................... G01S 7/56 367/108
4,672,590 A * 6/1987 Tendler ..................... G01S 7/56 367/109
5,495,689 A * 3/1996 Cassem .................. A01K 97/00 367/107
5,546,362 A 8/1996 Baumann et al.
6,222,449 B1 * 4/2001 Twining ................. A01K 97/00 177/148
6,345,179 B1 2/2002 Wiegers et al.
7,554,884 B2 6/2009 Park (Continued)

OTHER PUBLICATIONS

TheSportsmansGuide.com, Vexilar® FL—10 Flasher Fishfinder. No—guesswork fishfinding that fits in your dash!, http://www.sportsmansguide.com/net/cb/vexilar-fl-10-in-dash-flasher.aspx?a=735581[May 11, 2012 5:31:55 PM]; pp. 1-3.

(Continued)

*Primary Examiner* — Luke Ratcliffe
*Assistant Examiner* — Hovhannes Baghdasaryan
(74) *Attorney, Agent, or Firm* — Dicke, Billig & Czaja, PLLC

(57) ABSTRACT

A depth display device for use with a flasher type fish finder system including a primary unit and a transducer assembly. The depth display device includes an enclosure, a microcontroller, a display panel, a transducer port, and an interface cable. The transducer port is configured for connection with the transducer assembly cable. The interface cable terminates at a connector configured for connection with a receptacle of the primary unit. During use, the display device establishes an electrical connection between the primary unit and the transducer cable such that drive signals generated by the primary unit are delivered to the transducer assembly, and return signals generated by the transducer are delivered to the primary unit. The microcontroller samples the transmitter and return signals to determine a depth of a body of water, and operates the display panel to display the determined depth.

18 Claims, 2 Drawing Sheets

(56) References Cited

U.S. PATENT DOCUMENTS

| | | | | |
|---|---|---|---|---|
| 2004/0004904 | A1* | 1/2004 | Betts | A01K 93/02 367/3 |
| 2007/0161904 | A1* | 7/2007 | Urbano | A61B 8/00 600/459 |
| 2008/0291121 | A1 | 11/2008 | Cummings | |
| 2009/0141590 | A1* | 6/2009 | Betts | G01S 15/96 367/111 |
| 2011/0202278 | A1* | 8/2011 | Caute | G01S 7/003 702/14 |

OTHER PUBLICATIONS

MarineGeneral.com, Marcum LX-7 LCD Sonar System, http://www.marinegeneral.com/productdetails.asp?productid=1478347 [May 11, 2012 5:24:57 PM]; pp. 1-2.

MarineGeneral.com, Hunnminbird ICE-55 Flasher, http://www.marinegeneral.com/productdetails.asp?productid=1462519&directoryid=11737&parentid=10947[May 11, 2012 1:54:37 PM]; p. 1.

IceShanty.com, New ShowDown Ice-Troller, http://www.iceshanty.com/ice__fishing/index.php?topic=153857.0 [May 11, 2012 1:40:30 PM]; pp. 1-9.

BottomPaintStore.com, Raymarine ST40 Depth Display, http://www.bottompaintstore.com/raymarine-st40-depth-display-p-13169.html[May 11, 2012 5:29:38 PM]; pp. 1-2.

blogsMonroe.com, Fishing Michigan, http://www.blogsmonroe.com/fishing/page/26/?cat=1[May 11, 2012 3:35:19 PM], pp. 1-19.

ST40 Depth Instrument Owner's Handbook, May 1, 2001; pp. 1-6 & 11-18.

* cited by examiner

DIGITAL DEPTH READOUT ADAPTER FOR FLASHER TYPE FISH FINDER

CROSS REFERENCE TO RELATED APPLICATION

This Non-Provisional patent application claims priority under 35 U.S.C. §119(e)(1) to U.S. Provisional Patent Application Ser. No. 61/732,625, filed Dec. 3, 2012, entitled "DIGITAL DEPTH READOUT ADAPTER FOR FLASHER TYPE FISH FINDER," and the entire teachings of which are incorporated herein by reference.

BACKGROUND

The present disclosure relates to sonar equipment. More particularly, it relates to depth displaying accessories for use with a flasher type sonar system.

Sonar systems have long been used by anglers to gauge the depth of the body of water being fished, as well as the presence and depth of fish (commonly referred to as a "depth finder" or a "fish finder"). Sonar systems use a transducer (e.g., electroacoustic transducer) to generate a sonar pulse that is directed down through the water. The transducer receives a sonar echo return from the bottom of the body of water, as well as sonar returns from fish or other objects in the water and located within the transducer's sonar cone. The depth (or distance) and size of solid objects (e.g., fish, lure, bottom of the body of water, etc.) are then estimated based upon the speed and intensity of the echo return waves relative to the original sonar pulse. The estimated information is then signaled to a display.

With flasher type fish or depth finders, the display (or display unit) typically includes a housing having a circular ring lens or window with an adjacent scale indicative of a distance below the transducer. Mounted within the housing is a motor that turns a disc on which one or more light sources are maintained. As the disc rotates, light is emitted by the light sources at different positions around the ring to represent sonar returns from objects, as well as from the bottom of the body of water. The rotational position of the emitted light relative to a top dead center of the circular scale generally indicates a scaled distance or depth of the objects relative to the transducer.

With some flasher type fish finders, the transducer is permanently attached to or carried by the display unit's housing. Alternatively, the transducer can be part of a transducer assembly having a cable that is selectively connected to the display unit's housing (with the display unit further including various circuitry and controllers for operating the flasher type system). Such systems are widely used, for example, with ice fishing. During use, the transducer assembly is plugged into a port of the primary display unit. Additionally, at least one selector knob or other user input actuator is included with the primary display unit (e.g., assembled to the housing near the display) that allows the user to select a desired depth range (typically in ten foot increments). When the flasher type fish finder system is used by an angler on a body of water at a location having an unknown depth, the user makes a best guess as to the depth of the area being fished and "enters" this guess at the range selector knob. During operation, the flasher display gives a general indication as to the body of water's sensed "bottom," but does not provide any numerical depth information. Anglers often wish to know the actual depth. Moreover, if the actual depth is well outside of the selected range, the user will be generally apprised by the flasher display that a different depth range should be selected, but will not know what a more appropriate range setting might be.

In light of the above, a need exists for a device useful with conventional flasher type fish finder units and capable of providing a user with more exacting depth information.

SUMMARY

Some aspects in accordance with principles of the present disclosure relate to a water depth display device for use with a flasher type fish finder system. In this regard, the flasher type fish finder system includes a primary flasher display unit and a transducer assembly. The primary flasher display unit includes a sonar transmitter, and the transducer assembly includes a transducer and a cable. With this in mind, the water depth display device includes an enclosure, a depth microcontroller, a display panel, a transducer port, and an interface cable. The depth microcontroller is maintained within the enclosure. The display panel is carried by the enclosure and is electronically connected to the depth microcontroller. The transducer port is formed in the enclosure and is electronically connected to the depth microcontroller. The transducer port is configured to selectively establish a mechanical and electrical connection with the transducer assembly cable. The interface cable extends from the enclosure and terminates at a connector electronically connected to the depth microcontroller. The connector is configured to selectively establish a mechanical and electrical connection with a transducer receptacle of the primary flasher display unit. The depth microcontroller is programmed, upon connecting the water depth display device between the primary flasher display unit and the transducer assembly, to perform various functions. For example, the depth microcontroller is programmed to establish an electrical connection between the primary flasher display unit and the transducer cable such that drive signals generated by the transmitter of the primary flasher display unit are delivered to the transducer assembly, and return signals generated by the transducer in response to detected echo waves are delivered to the primary flasher display unit. Further, the depth microcontroller is programmed to sample the transmitter signals and the return signals to determine a depth of a body of water at which the transducer is located. Finally, the depth microcontroller is programmed to prompt the display panel to display the determined depth in numerical form. In some embodiments, the depth microcontroller is further programmed to operate in a predetermined mode as a function of a determined power status of the primary flasher display unit. In other embodiments, the water depth display device includes a battery status module and/or a temperature module.

The water depth display devices of the present disclosure are highly portable and can be used with a plethora of different flasher type fish finder systems. Water depth information is readily displayed to a user in an easy to understand, digital form.

DETAILED DESCRIPTION

Figure 1:
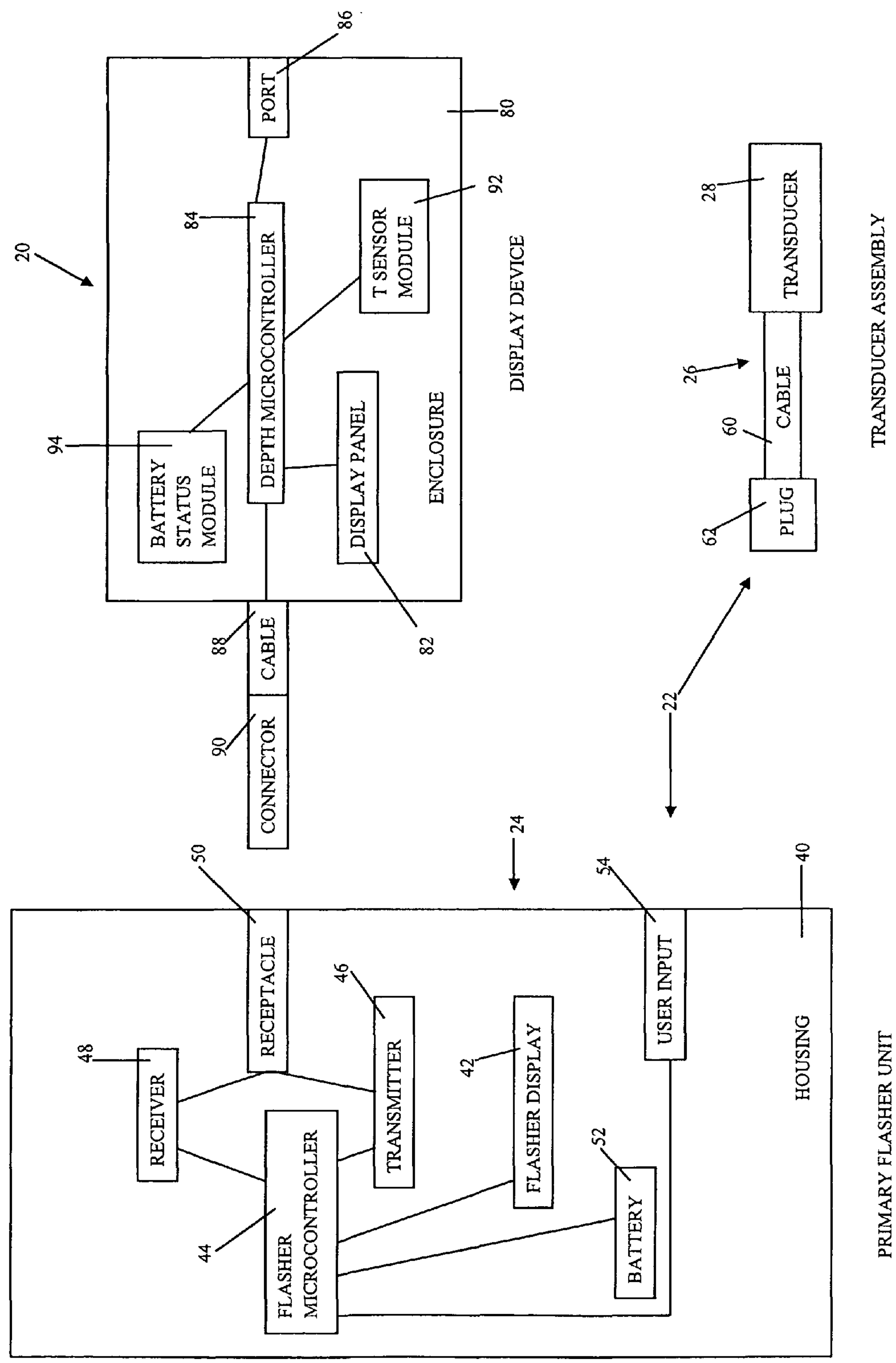
FIG. 1 is a block diagram of a water depth display device in accordance with principles of the present disclosure, along with a flasher type fish finder system with which the display device is useful.

One embodiment of a water depth display device 20 in accordance with principles of the present disclosure is shown in FIG. 1. As a point of reference, the display device 20 is configured for use with a flasher type fish finder system 22 that includes a primary display unit 24 and a transducer assembly 26 having a transducer 28. As made clear below, the display device 20 can be an accessory to the flasher type fish finder system 22. The display device 20 is generally configured to be connected in series between the primary display unit 24 and the transducer assembly 26, facilitating normal operation of the system 22 in determining and displaying (flasher type display) general size and distance information of objects within the sonar cone of the transducer 28. In addition, the display device 20 determines a depth of the floor or bottom of the body of water above which the transducer 28 is located, and digitally displays the so-determined depth to the user in numerical form.

By way of additional background, the flasher type fish finder system 22 can be of any conventional design. The primary display unit 24 generally includes a housing 40 maintaining a variety of components, including a flasher display 42 and various circuitry components. For example, the circuitry components of the primary display unit 24 include a flasher microcontroller 44, a transmitter 46 and a receiver 48. The transmitter 46 can assume any form typically employed for generating drive signals (e.g., an oscillator circuit) that in turn prompt the transducer 28 to emit sonar waves. The receiver 48 can also be of any conventional type adapted to receive echo return signals from the transducer assembly 26. In some embodiments, the transmitter 46 and the receiver 48 are provided as a single circuitry module such as a transceiver. Regardless, the flasher microcontroller 44 controls operation of the transmitter 46 and the receiver 48, as well as interprets signals generated by the transmitter 46 and received at the receiver 48 in determining information relating to objects within the sonar cone of the transducer 28. Further, the flasher microcontroller 44 prompts operation of the flasher display 42 in accordance with conventional protocols. It will be understood that the primary display unit 24 can include a variety of other circuitry components (converters, amplifiers, buffers, memory, etc.). Regardless, the primary display unit 24 forms a receptacle 50 along the housing 40 that is electronically connected to the receiver 48 and establishes a frame for mechanically receiving and maintaining a corresponding plug inserted therein. The primary display unit 24 can include additional components, such as a battery 52 and one or more user inputs 54. The user input(s) 54 can assume various forms (e.g., a knob rotatably maintained at an exterior of the housing 40), and are adapted to deliver user-entered control information to the flasher microcontroller 44, such as gain, range, mode of operation, etc.

Some examples of primary flasher type display units useful with display devices 20 of the present disclosure are available from Vexilar, Inc. of Minneapolis, Minn. under the trade names FL-8® SE, FL-12™, FL-18®, FL-20™, and FL-22™ HD to name but a few.

The transducer assembly 26 is configured to interface with the selected format of the primary display unit 24, and generally includes the transducer 28, a cable 60 and a plug 62. The transducer 28 can assume any form appropriate for transmitting sound waves (e.g., sonar signals) through water and for detecting the return of echo signals bouncing off the floor or bottom of the body of water or objects in the water such as fish (e.g., an electroacoustic transducer). As is known in the art, the sound waves or energy generated by the transducer 28 are generally transmitted in a radiation pattern axi-symmetrical. The radiated energy generally decreases away from the center or centerline of the pattern to form a generally conically-shaped beam. The cable 60 extends from the transducer 28 and carries electronic drive signals (i.e., as generated by the transmitter 46) to the transducer 28, and carries electrical return signals generated by the transducer 28 (i.e., electrical signals generated in accordance with received echoes) for processing by the receiver 48. The plug 62 is sized and shaped to be received by the primary display unit receptacle 50.

The transducer assembly 26 can incorporate various other features not directly implicated by FIG. 1. Regardless, some examples of transducer assemblies useful with the present disclosure are available from Vexilar, Inc. of Minneapolis, Minn. under the trade designations Ice-ducer®, Dual Beam Ice-ducer®, Tri-Beam Ice-ducer®, AlumaDucer®, 12 Degree Puck Transducer, 12 Degree High Speed Transducer, etc.

Components of the display device 20 can be better understood with cross-reference to various components of the flasher system 22 described above. In particular, the display device 20 includes an enclosure or housing 80 maintaining a display panel 82 and various circuitry components. For example, the display device 20 includes a microcontroller (or "depth microcontroller") 84 that includes or acts upon various other circuitry components in performing the operations described below. The depth microcontroller 84 is electronically connected to the display panel 82 and is programmed to prompt operation of the display panel 82 as described below. A transducer port 86 is formed by the enclosure 80, and is configured to establish mechanical and electrical connection with the transducer assembly plug 62. An interface cable 88 extends from the enclosure 80, and terminates at a connector 90 configured to establish mechanical and electrical connection with the primary display unit receptacle 50. The interface cable 88 can be of a type known in the art, and can have various lengths. In some embodiments, the interface cable 88 is flexible and has a length of at least 12 inches for reasons made clear below.

The display panel 82 can assume a wide variety of forms as known in the art, and can be an electronic digital display panel (with corresponding electronics and optional controller) such as a segment display in which digits are displayed by powering the LED(s) or liquid crystal(s) of the appropriate segments. Alternatively, the display panel 82 can be a two-dimensional display as known in the art.

Wiring or other circuitry provided with the display device 20 electrically interconnects the transducer port 86 and the interface cable 88. Thus, signals received at the connector 90 are delivered to the transducer port 86, and vice-versa. The depth microcontroller 84 is electronically coupled to this circuitry, and is programmed to monitor or sample signals received at the transducer port 86 and at the interface cable 88.

In some embodiments, the display device 20 further includes an optional temperature sensor module 92. The temperature sensor module 92 can assume a wide variety of forms, and includes a temperature sensor as is known in the art. The depth microcontroller 84 is electronically connected to the temperature sensor module 92, and is programmed to prompt the display panel 82 to display temperature information derived by the temperature sensor module 92.

In some embodiments, the display device 20 optionally includes a battery status module 94. The battery status module 94 can assume a variety of forms, and is generally programmed to determine a charge capacity of the battery 52 of the primary display unit 24 when the display device 20 is connected to the primary display unit 24 via the interface cable 88. For example, the battery status module 94 can be programmed to recognize both the discharge and charge cycle of the battery 52, and sense the current charging condition of the battery 52 to generate a percentage of remaining capacity. Regardless, the depth microcontroller 84 is electronically connected to the battery status module 94 (and/or the battery status module 94 can be a programmed operation of the depth microcontroller 84), and is programmed to prompt the display panel 82 to display information indicative of a status of the battery 52 (e.g., the determined remaining capacity percentage of the battery 52). Further, the battery status module 94 can include a user actuator (e.g., a button carried along the enclosure 80) that when actuated, prompts the battery status module 94 (and/or the depth microcontroller 84) to display the measured charge capacity percentage (or other information indicative of battery life).

Figure 2:
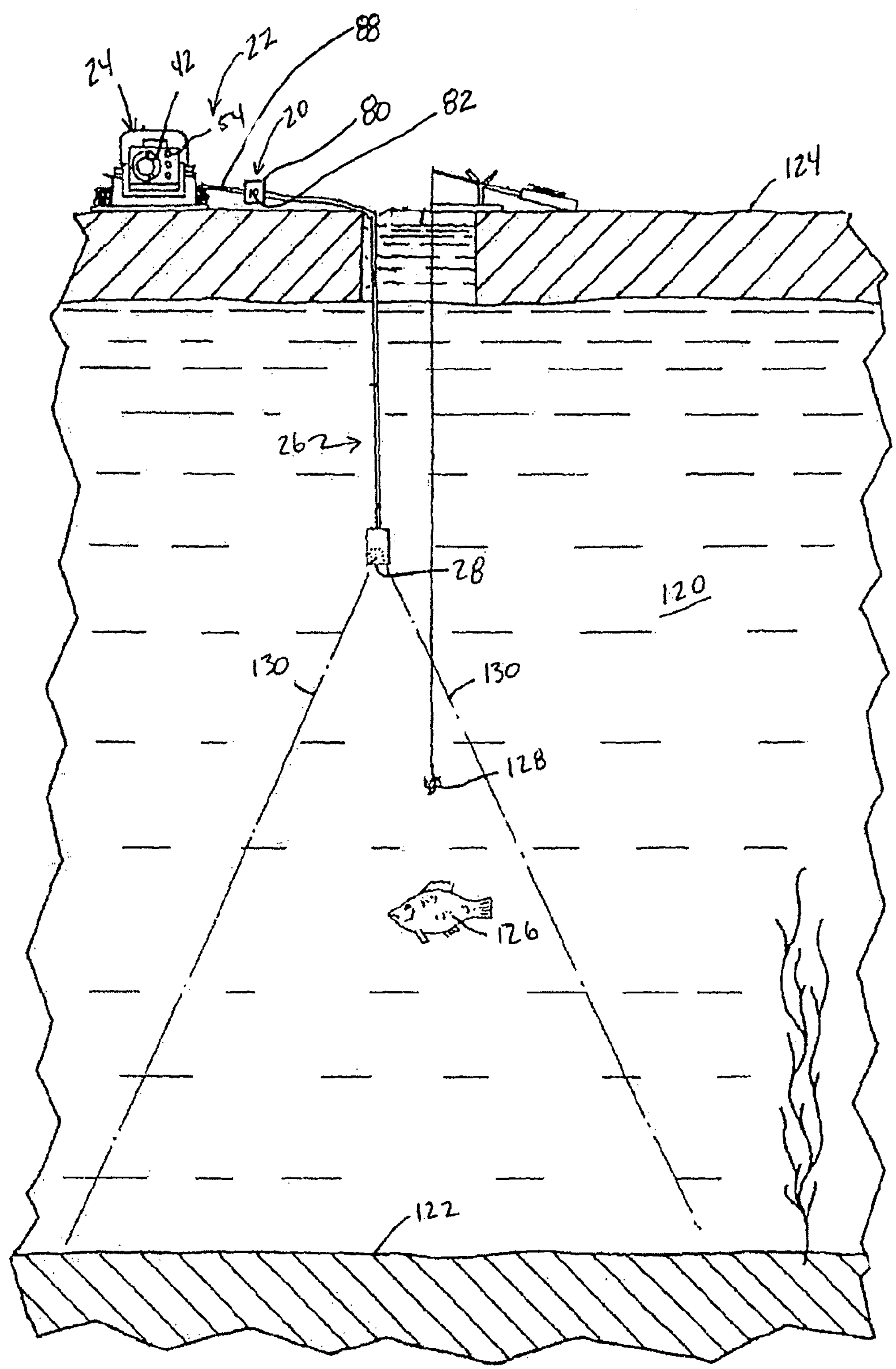
FIG. 2 illustrates the display device and flasher type fish finder system of FIG. 1 in use at a body of water.

As indicated by the above, the depth microcontroller 84 is programmed to perform various operations during use of the display device 20 (i.e., upon connecting the connector 90 to the primary display unit 24 and the transducer assembly plug 62 to the transducer port 86). A primary operation provided by the depth microcontroller 84 is determining a depth of the body of water at which the flasher system 22 is being used. As a point of reference, FIG. 2 illustrates one possible environment in which the flasher system 22 and the display device 20 may be used. As shown, the environment generally includes a body of water 120 and a bottom land surface 122. A body of ice 124 may exists at a top of the body of water 120, and various objects, such as a fish 126, and a lure or other bait 128 are within the body of water 120 and above the bottom land surface 122. The display device 20 is connected in series between the primary display unit 24 and the transducer assembly 26. For example, and with additional reference to FIG. 1, the display device connector 90 is coupled to the primary display unit receptacle 50, and the transducer assembly plug 62 is coupled to the display device transducer port 86.

During use, the flasher system 22 operates as otherwise intended (i.e., as if the transducer assembly 26 were directly connected to the primary display unit 24). A flexibility of the interface cable 88 allows the user to easily handle and maneuver the display device enclosure 80 relative to the primary display unit 24, for example allowing the user to readily move the enclosure 80 to view the display panel 82 without disturbing the primary display unit 24 and maintaining active connection between the primary display unit 24, the display device 20, and the transducer assembly 26. The primary display unit 24 generates a sonar drive signal at the transmitter 46. The drive signal is delivered to the transducer assembly 26 via the display device 20, prompting the transducer 28 to project a sonar wave, for example in the shape of a cone 130, into the body of water 120. Echo or return signals detected by the transducer 28 are forwarded to the primary display unit receiver 48 via the display device 20, with the flasher microcontroller 44 operating to estimate a distance and size of objects such as the fish 126, the bait 128 and the bottom surface 122 relative to the transducer 28, and then prompting the flasher display 42 to indicate the estimations on the flasher display 42 in accordance with conventional protocols.

In conjunction with the normal operation of the flasher system 22, the depth microcontroller 84 is programmed to sample the signals generated by, and returned to, the primary display unit 24, and to determine a depth of the bottom surface 122 from the so-sampled signals. For example, the depth microcontroller 84 can be programmed to recognize a "strong" return signal from the transducer assembly 26 as being indicative of the bottom land surface 122, and then calculate the depth based upon the corresponding drive signal and the return signal. Regardless, the depth microcontroller 84 does not actively determine the depth of any other objects (such as the fish 126 or the bait 128). Further, the display device 20 does not generate any sonar drive signals. Instead, the depth microcontroller 84 relies solely upon the drive signals generated by the primary display unit 24 (and the echo return signals from the transducer assembly 26) to generate depth information in a slave-repeater fashion. By not including a separate sonar drive transmitter, the display devices 20 of the present disclosure save on cost and power consumption, and also help eliminate extra interference by not introducing another sonar pulse into the water. In some embodiments, the depth microcontroller 84 can incorporate various software programs that assist in better interpreting the "bottom" signal from the transducer assembly 26 under various circumstances. Regardless, the depth microcontroller 84 prompts the display panel 82 to display the so-determined depth of the bottom surface 122 in numerical form (e.g., feet, meters, etc.). Notably, by sampling the drive signal as delivered to the transducer assembly 26, the depth microcontroller 84, and thus the display device 20, operates independent of any user-prompted adjustments at the primary display unit 24. For example, the primary display unit 24 may provide the user inputs 54 (described above) that allow a user to adjust or select a depth range, gain, etc. These "adjustments" do not affect the drive signal delivered to the transducer assembly 26, and thus do not affect operation of the display device 20. Further, the depth microcontroller 84 can be programmed to use the IR-function of the primary display unit 24 to help eliminate false readings from other sonar units potentially being used in the nearby environment.

The display device 20 can be used in the manners described above with a number of different primary display units 24 and a number of different transducer assemblies 26. For example, the same display device 20 can be used with a first primary display unit 24 and then later with a second primary display 24 that is different from the first primary display unit 24.

The depth microcontroller 84 can optionally be programmed to operate in a predetermined power mode as a function of a powering state of the primary display unit 24. For example, the depth microcontroller 84 can be programmed to recognize when the primary display unit 24 has been turned on by a user, and automatically power the display device 20 to a powered on condition. When the depth microcontroller 84 determines that the primary display unit 24 has been turned off, the display device 20 automatically enters a low power or sleep mode. Thus, the display device 20 can remain connected to the battery 52 of the primary display unit 24 indefinitely without running down the battery 52 (e.g., within the battery's 52 range of self discharge).

In some embodiments, and as described above, the display device 20 optionally includes the temperature sensor module 92. Where provided, the depth microcontroller 84 can be programmed to prompt the display panel 82 to display the determined temperature, for example in response to user actuation of the temperature sensor module 92. Similarly, where provided, the battery status module 94 can generate information relating to a status of the battery 52 of the primary display unit 24, with the depth microcontroller 84 programmed to prompt the display panel 82 to display the so-determined battery status information, for example in response to a user prompt of the battery status module 94.

While the display device 20 has been described as being configured for wired connection to the primary display unit 24 and the transducer assembly 26, in other embodiments a wireless format can be employed for one or both connections. In other alternative embodiments, the display device 20 can include an internal battery for powering the components of the display device 20. Regardless, the display device 20, and in particular the enclosure 80, is relatively small and easily handled and transported. For example, the enclosure 80 can be sized and shaped to be handled by a single adult human hand, and is smaller than the primary unit housing 40. In yet other embodiments, the display device 20 as described herein is built in to the primary display unit 24.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein.

What is claimed is:

1. A combination water depth display device and a flasher type fish finder system, the combination water depth display device and flasher type fish finder system comprising:
- a flasher type fish finer system including:
  - a first enclosure,
  - a primary flasher display unit having a flasher display, flasher microcontroller and a sonar transmitter, and
  - a transducer assembly having a transducer and a cable; and
- a water depth display device including:
  - a second enclosure,
  - a depth microcontroller maintained within the second enclosure and outside of the first enclosure,
  - a display panel carried by the second enclosure and electronically connected to the depth microcontroller,
  - a transducer port formed in the second enclosure and electronically connected to the depth microcontroller, the transducer port configured to selectively establish a mechanical and electrical connection with the transducer assembly cable, and
  - an interface cable extending from the second enclosure and terminating at a connector electronically connected to the depth microcontroller, the connector configured to selectively establish a mechanical and electrical connection with a transducer receptacle of the primary flasher display unit; wherein the depth microcontroller is programmed, upon connecting the water depth display device between the primary flasher display unit and the transducer assembly, to:
    - establish an electrical connection between the primary flasher display unit and the transducer cable such that drive signals generated by the transmitter of the primary flasher display unit are delivered to the transducer assembly, and return signals generated by the transducer in response to detected echo waves are delivered to the primary flasher display unit,
    - sample the transmitter signals and the return signals to determine a depth of a body of water at which the transducer is located,
    - prompt the display panel to display the determined depth in numerical form.

2. The combination of claim 1, wherein the depth microcontroller is further programmed to:
- determine whether a power status of the primary flasher display unit is powered on or powered off; and
- operate in a predetermined mode as a function of the determined power status.

3. The combination of claim 2, wherein the depth microcontroller is further programmed to:
- operate in an active mode when the power status of the primary flasher display unit is powered on; and
- operate in a sleep mode when the primary flasher display unit is powered off.

4. The combination of claim 1, wherein the depth microcontroller is further programmed to determine the depth of the body of water independent of other user settings at the primary flasher display unit.

5. The combination of claim 1, further comprising:
- a battery status module carried by the second enclosure;
- wherein the depth microcontroller is further programmed to determine a battery status level of the primary flasher display unit based upon sampled signals and to prompt the display panel to display the determined battery level status.

6. The combination of claim 1, further comprising:
- a temperature module carried by the second enclosure and electronically connected to the depth microcontroller;
- wherein the depth microcontroller is further programmed to prompt the display panel to display a temperature as determined by the temperature module.

7. The combination of claim 1, wherein the display panel is a digital display panel.

8. The combination of claim 1, wherein the interface cable has a length of at least 12 inches.

9. The combination of claim 1, wherein the depth microcontroller is programmed to generate depth information in a slave-repeater fashion based upon drive signals generated by the primary flasher display unit.

10. The combination of claim 1, wherein the second enclosure is configured to be hand-held.

11. The combination of claim 1, wherein the primary flasher display unit has a flasher microcontroller and the depth microcontroller is apart from the flasher microcontroller.

12. A method of displaying water depth information, the method comprising:
- providing a flasher type fish finder system having a first enclosure, the flasher type fish finder system including a primary flasher display unit and a transducer assembly, the primary flasher display unit including a flasher display, flasher microcontroller and a sonar transmitter carried by the first enclosure and the transducer assembly including a transducer and a cable;
- providing a water depth display device apart from the primary flasher display unit and the transducer assembly, the water depth display device including:
  - a second enclosure,
  - a depth microcontroller maintained within the second enclosure and outside of the first enclosure,
  - a display panel carried by the second enclosure and electronically connected to the depth microcontroller,
  - a transducer port formed in the second enclosure and electronically connected to the depth microcontroller,
  - an interface cable extending from the second enclosure and terminating at a connector electronically connected to the depth microcontroller;

connecting the connector to a transducer receptacle of the primary flasher display unit;

connecting the cable of the transducer assembly to the transducer port;

operating the primary flasher display unit, wherein the depth microcontroller establishes an electrical connection between the primary flasher display unit and the transducer cable such that drive signals generated by the transmitter of the primary flasher display unit are delivered to the transducer assembly, and return signals generated by the transducer in response to detected echo waves are delivered to the primary flasher display unit;

sampling the transmitter signals and the return signals by the depth microcontroller to determine a depth of a body of water at which the transducer is located; and displaying the determined depth in numerical form at the display panel.

13. The method of claim 12, further comprising:

displaying a determined status of battery provided with the primary flasher display unit at the display panel.

14. The method of claim 12, further comprising:

displaying a temperature at the display panel.

15. The method of claim 14, wherein the water depth display device further includes a temperature sensor.

16. The method of claim 12, further comprising:

locating the transducer below a surface of a body of water, the surface being opposite a floor of the body of water;

wherein the step of operating the primary flasher display unit includes the primary flasher display unit displaying information indicative of objects between the transducer and the floor, and further wherein the water depth display device does not display the information indicative of objects between the transducer and the floor.

17. The method of claim 12, further comprising:

moving the second enclosure relative to the first enclosure during the steps of operating the primary flasher display unit and displaying the determined depth on the display panel.

18. The method of claim 12, wherein the depth display device does not include a sonar drive transmitter.

* * * * *